US011606550B2

(12) United States Patent
Horesh

(10) Patent No.: US 11,606,550 B2
(45) Date of Patent: Mar. 14, 2023

(54) TECHNIQUES FOR PREDICTIVE SENSOR RECONFIGURATION

(71) Applicant: R-Go Robotics LTD., Caesarea (IL)

(72) Inventor: Nizan Horesh, Caesarea (IL)

(73) Assignee: R-Go Robotics Ltd., Caesarea (IL)

( * ) Notice: Subject to any disclaimer, the term of this patent is extended or adjusted under 35 U.S.C. 154(b) by 0 days.

(21) Appl. No.: 17/403,196

(22) Filed: Aug. 16, 2021

(65) Prior Publication Data

US 2021/0373567 A1   Dec. 2, 2021

Related U.S. Application Data

(63) Continuation of application No. 17/066,141, filed on Oct. 8, 2020, now Pat. No. 11,119,497, which is a
(Continued)

(51) Int. Cl.
*G06F 17/00* (2019.01)
*H04N 17/00* (2006.01)
(Continued)

(52) U.S. Cl.
CPC ......... *H04N 17/002* (2013.01); *G05D 1/0234* (2013.01); *G05D 1/0274* (2013.01);
(Continued)

(58) Field of Classification Search
CPC .. G05D 1/0234; G05D 1/0274; G05D 1/0246; G05D 1/0272; G06V 10/44;
(Continued)

(56) References Cited

U.S. PATENT DOCUMENTS 9,840,256 B1 * 12/2017 Valois ................. G05D 1/021
9,934,573 B2 *  4/2018 Reif .................... G06F 1/163
(Continued)

FOREIGN PATENT DOCUMENTS

EP    2972478 A2   1/2016
GB    2541884 A    3/2017
(Continued)

OTHER PUBLICATIONS

International Search Report and Written Opinion of International Searching Authority for PCT/US2020/030661, ISA/RU, Moscow, Russia, dated Sep. 10, 2020.
(Continued)

*Primary Examiner* — Ronnie M Mancho
(74) *Attorney, Agent, or Firm* — M&B IP Analyst, LLC

(57) ABSTRACT

Systems and methods for optimizing sensory signal capturing by reconfiguring robotic device configurations. A method includes determining at least one predicted future sensor reading for a robotic device based on navigation path data of the robotic device, wherein the robotic device is deployed with at least one sensor, wherein each predicted future sensor reading is an expected value of a future sensory signal; determining an optimized sensor configuration based on the at least one predicted future sensor reading, wherein the optimized sensor configuration optimizes capturing of sensor signals by the at least one sensor; and reconfiguring the at least one sensor based on the optimized sensor configuration, wherein reconfiguring the at least one sensor further comprises modifying at least one sensor parameter of the at least one sensor based on the optimized sensor configuration.

19 Claims, 5 Drawing Sheets

Related U.S. Application Data continuation of application No. PCT/US2020/030661, filed on Apr. 30, 2020.

(60) Provisional application No. 62/877,546, filed on Jul. 23, 2019.

(51) Int. Cl.
| | |
|---|---|
| *G05D 1/02* | (2020.01) |
| *H04N 21/24* | (2011.01) |
| *G06V 10/147* | (2022.01) |
| *G06V 10/22* | (2022.01) |
| *G06V 20/10* | (2022.01) |

(52) U.S. Cl.
CPC ............ *G06V 10/147* (2022.01); *G06V 10/22* (2022.01); *G06V 20/10* (2022.01); *H04N 21/2404* (2013.01)

(58) Field of Classification Search
CPC ...... G06V 10/147; G06V 10/22; G06V 20/10; H04N 21/2404; H04N 5/23222; H04N 5/2352; H04N 17/002; G01S 7/4808; G01S 7/497; G01S 17/42; G01S 17/89; G01S 17/931
USPC ...................................................... 700/259
See application file for complete search history.

(56) References Cited

U.S. PATENT DOCUMENTS

| | | | | |
|---|---|---|---|---|
| 10,142,553 | B2* | 11/2018 | Horesh | .................. G03B 15/05 |
| 10,182,181 | B2* | 1/2019 | Horesh | ................ H04N 5/2256 |
| 10,395,117 | B1* | 8/2019 | Zhang | .................... G06V 20/20 |
| 10,447,920 | B2* | 10/2019 | Horesh | ..................... G06T 7/13 |
| 10,609,359 | B2* | 3/2020 | Horesh | ................ G01S 7/4817 |
| 10,659,764 | B2* | 5/2020 | Horesh | ................ H04N 13/296 |
| 10,814,492 | B2* | 10/2020 | Horesh | .................... B25J 19/02 |
| 11,100,602 | B2* | 8/2021 | Horesh | ............. G01C 21/3602 |
| 11,103,151 | B2* | 8/2021 | Rappaport | ............. A61B 5/091 |
| 11,119,497 | B2* | 9/2021 | Horesh | ................ G05D 1/0234 |
| 11,145,076 | B1* | 10/2021 | Horesh | .................... G06T 7/269 |
| 2007/0214462 | A1* | 9/2007 | Boillot | ..................... G06F 3/017 |
| | | | | 719/328 |
| 2012/0083982 | A1* | 4/2012 | Bonefas | ............... G05D 1/0223 |
| | | | | 382/153 |
| 2012/0232847 | A1* | 9/2012 | Horton | ................... G01C 21/16 |
| | | | | 702/189 |
| 2013/0211782 | A1* | 8/2013 | Rosenberg | ................ B25J 9/16 |
| | | | | 702/182 |
| 2016/0156600 | A1 | 6/2016 | Hofmeister | |
| 2016/0210525 | A1* | 7/2016 | Yang | .................. G06V 30/2504 |
| 2017/0311013 | A1 | 10/2017 | Acharya et al. | |
| 2018/0181136 | A1 | 6/2018 | Loosararian et al. | |
| 2018/0278823 | A1* | 9/2018 | Horesh | .............. H04N 5/23251 |
| 2019/0156600 | A1* | 5/2019 | Potyrailo | ............. G07C 5/0816 |
| 2019/0222652 | A1* | 7/2019 | Graefe | .................... H04L 67/12 |
| 2020/0111011 | A1* | 4/2020 | Viswanathan | ........ G01C 21/005 |
| 2020/0159229 | A1* | 5/2020 | Horesh | ................ G05D 1/0212 |
| 2020/0262086 | A1* | 8/2020 | Horesh | ................ G01B 7/023 |
| 2020/0394807 | A1* | 12/2020 | Horesh | .................... G06T 7/292 |
| 2020/0400818 | A1* | 12/2020 | Horesh | ................ G06V 10/141 |
| 2021/0373562 | A1* | 12/2021 | Bousani | ................ G05D 1/0274 |
| 2021/0373567 | A1* | 12/2021 | Horesh | ................ G05D 1/0246 |

FOREIGN PATENT DOCUMENTS

| | | | |
|---|---|---|---|
| WO | 2014152254 | A2 | 9/2014 |
| WO | 2014152254 | A3 | 11/2014 |

OTHER PUBLICATIONS

"European Search Report for EP20844377.0" European Patent Office, Munich, Germany. dated Nov. 30, 2022.

* cited by examiner

TECHNIQUES FOR PREDICTIVE SENSOR RECONFIGURATION

CROSS-REFERENCE TO RELATED APPLICATIONS

This application is a continuation of U.S. patent application Ser. No. 17/066,141 filed on Oct. 8, 2020, now allowed. The Ser. No. 17/066,141 application is a continuation of International Patent Application No. PCT/US2020/030661 filed on Apr. 30, 2020, which claims the benefit of U.S. Provisional Application No. 62/877,546 filed on Jul. 23, 2019.

The contents of the above-referenced applications are hereby incorporated by reference.

TECHNICAL FIELD

The present disclosure relates generally to robotic devices, and more specifically to configuring robotic devices for optimal sensor performance.

BACKGROUND

Robotic devices are increasingly used for purposes that require movement. To this end, robotic devices are often equipped with sensors for capturing data about the environments in which they move. As a particular example, these sensors may include sensors for capturing images or other visual multimedia content as the robotic devices move. Other sensors that may be used include inertial sensors and motion encoders.

When image capturing is required, movement of the robotic device may cause blurry or otherwise unsuitable images to be captured. Likewise, other sensors may be affected by movements, thereby resulting in inaccurate sensor readings.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for optimizing capture of sensory signals. The method comprises: determining at least one predicted future sensor reading for a robotic device based on navigation path data of the robotic device, wherein the robotic device is deployed with at least one sensor, wherein each predicted future sensor reading is an expected value of a future sensory signal; determining an optimized sensor configuration based on the at least one predicted future sensor reading, wherein the optimized sensor configuration optimizes capturing of sensor signals by the at least one sensor; and reconfiguring the at least one sensor based on the optimized sensor configuration, wherein reconfiguring the at least one sensor further comprises modifying at least one sensor parameter of the at least one sensor based on the optimized sensor configuration.

Certain embodiments disclosed herein also include a non-transitory computer readable medium having stored thereon causing a processing circuitry to execute a process, the process comprising: determining at least one predicted future sensor reading for a robotic device based on navigation path data of the robotic device, wherein the robotic device is deployed with at least one sensor, wherein each predicted future sensor reading is an expected value of a future sensory signal; determining an optimized sensor configuration based on the at least one predicted future sensor reading, wherein the optimized sensor configuration optimizes capturing of sensor signals by the at least one sensor; and reconfiguring the at least one sensor based on the optimized sensor configuration, wherein reconfiguring the at least one sensor further comprises modifying at least one sensor parameter of the at least one sensor based on the optimized sensor configuration.

Certain embodiments disclosed herein also include a system for optimizing capture of sensory signals. The system comprises: a processing circuitry; and a memory, the memory containing instructions that, when executed by the processing circuitry, configure the system to: determine at least one predicted future sensor reading for a robotic device based on navigation path data of the robotic device, wherein the robotic device is deployed with at least one sensor, wherein each predicted future sensor reading is an expected value of a future sensory signal; determine an optimized sensor configuration based on the at least one predicted future sensor reading, wherein the optimized sensor configuration optimizes capturing of sensor signals by the at least one sensor; and reconfigure the at least one sensor based on the optimized sensor configuration, wherein reconfiguring the at least one sensor further comprises modifying at least one sensor parameter of the at least one sensor based on the optimized sensor configuration.

BRIEF DESCRIPTION OF THE DRAWINGS

The subject matter disclosed herein and other objects, features, and advantages of the disclosed embodiments will be apparent from the following detailed description taken in conjunction with the accompanying drawings.

DETAILED DESCRIPTION

Figure 1:
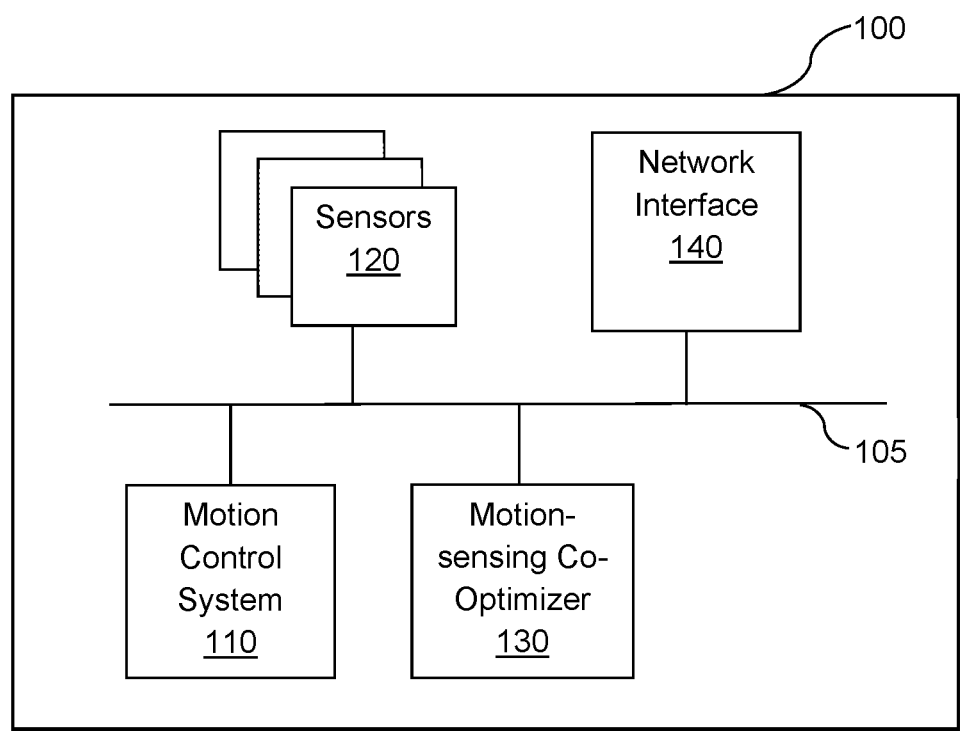
FIG. 1 is a schematic diagram of a robotic device that may be utilized in accordance with the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Robotic devices having sensors may capture sensory signals during navigation that feature imperfections due to causes such as moving too quickly, insufficient exposure, and the like. Visual multimedia content such as images and video may be particularly vulnerable to these imperfections. For example, an image captured while taking a sharp turn may be blurry. The imperfections may render the captured sensory signals inaccurate or otherwise unsuitable for use in navigation.

To this end, it has been identified that dynamically adjusting sensor configurations while a robotic device is being deployed would allow for improving quality of sensory signals captured by the robotic device. In particular, sensor parameters may be tuned to optimize capturing of expected future sensory signals. Thus, the disclosed embodiments provide techniques for determining optimal sensor parameters based on past sensory signals.

Similarly, it has been identified that performing certain maneuvers or planning movement along certain navigation paths may allow for capturing better sensor readings. Thus, the disclosed embodiments also provide techniques for reconfiguring sensors or motion controls to obtain better sensor readings and, therefore, more accurate determination of robotic device navigation parameters.

The various disclosed embodiments include techniques for co-optimization of motion and vision control. To this end, the disclosed embodiments provide methods and systems in which configurations of robotic devices capturing sensory signals as they move are modified in order to improve quality of the captured sensory signals.

In an embodiment, modifying the configuration includes optimizing sensor parameters. A navigation path of a robotic device is analyzed to determine predicted sensory signals. Based on the predicted sensory signals, optimal sensor parameters for capturing future sensory signals are determined for one or more future times. The optimal sensor parameters are applied, for example by reconfiguring the sensors of the robotic device immediately prior to their respective times. Accordingly, optimal sensor parameters may be utilized at different portions of the navigation.

In another embodiment, modifying the configuration includes optimizing movement configuration of a robotic device based on sensory signals. Sensory data collected by the robotic device is analyzed to determine any deficiencies or potential deficiencies therein. Based on the determined deficiencies, subsequent movements of the robotic device are adapted by modifying movement configuration to reduce the deficiencies.

The disclosed techniques may be integrated. For example, sensor parameters may be modified based on predicted future sensory signals while movement configurations are modified based on actual sensory signals collected. Further, the predicted future sensory signals may be adjusted based on the actual sensory signals and modifications to movement configurations. Integrating the techniques provides further improvements to accuracy of the reconfigurations and, as a result, further improve quality of collected sensory signals.

The disclosed embodiments provide techniques for improving the quality of signals captured by sensors installed on or otherwise deployed with a robotic device as the robotic device moves from one location to another. The sensors may include, but are not limited to, visual multimedia content sensors (e.g., cameras), inertial sensors, motion encoders, magnetometers, global navigation satellite system (GNSS) receivers, barometers, and the like. It should be noted that the disclosed embodiments are described with respect to moving robotic devices for simplicity, but that any system that is moved (either autonomously or by virtue of being mounted on or otherwise deployed in a moving device) and includes or is deployed with sensors whose readings may be affected by movements may be improved in accordance with the disclosed techniques.

The disclosed embodiments may be utilized in various applications. In particular, various disclosed embodiments may be applicable to robotic devices which navigate and, as part of navigation, capture images of their surroundings. Other non-limiting example use cases include lawn mowing robots, floor cleaner robots, warehouse logistics robots, disinfection robots, and the like. As a non-limiting example, a lawn mowing robot capturing images used to determine locations which require mowing may be configured to lower shutter speed to accommodate a predicted future image captured in high intensity light. As another non-limiting example, a floor cleaner robot may be configured to adjust its navigation path in order to avoid low visibility locations in which future images are predicted to be low quality. As yet another non-limiting example, a warehouse logistics robot may be configured to perform a maneuver in order to calibrate its image capturing parameters.

FIG. 1 shows an example schematic diagram of a robotic device 100 that may be utilized in accordance with the disclosed embodiments. The example robotic device 100 includes a motion control system 110, sensors 120, a motion-sensing co-optimizer 130, and a network interface 140. In some implementations, the components of the robotic device 100 may communicate over a bus 105.

The motion control system 110 is configured to control one or more components (not shown) configured to cause movement of the robotic device 110 such as, but not limited to, engines, motors, propellers, wheels, steering mechanisms, combinations thereof, and the like. The motion control system 110 may be configured to control such movement as would be apparent to one having ordinary skill in the art, and the control may be altered based on configurations determined in accordance with the disclosed embodiments.

The sensors 120 include one or more sensors such as, but not limited to, cameras, motion encoders, accelerometers, gyroscopes, magnetometers, barometers, global navigation satellite system (GNSS) receivers, global positioning systems (GPSs), and the like.

The motion-sensing co-optimizer 130 is configured to optimize capturing of sensory signals by the sensors 120 via reconfiguration of the motion control system 110, the sensors 120, or both. Specifically, the reconfiguration may be performed as described further with respect to FIG. 2, with respect to FIG. 3, or both.

The network interface 140 allows the robotic device 100 to communicate with one or more external systems (not shown). As a non-limiting example, the robotic device 100 may receive commands from a control server (not shown) that may alter its navigation path. In some implementations, the network interface 140 may allow the robotic device 100 to communicate with an external motion-sensing co-optimizer configured, for example, as described with respect to FIG. 4.

The communication may occur via one or more networks such as, but not limited to, a wireless, cellular or wired network, a local area network (LAN), a wide area network (WAN), a metro area network (MAN), the Internet, the worldwide web (WWW), similar networks, and any combination thereof.

Figure 2:
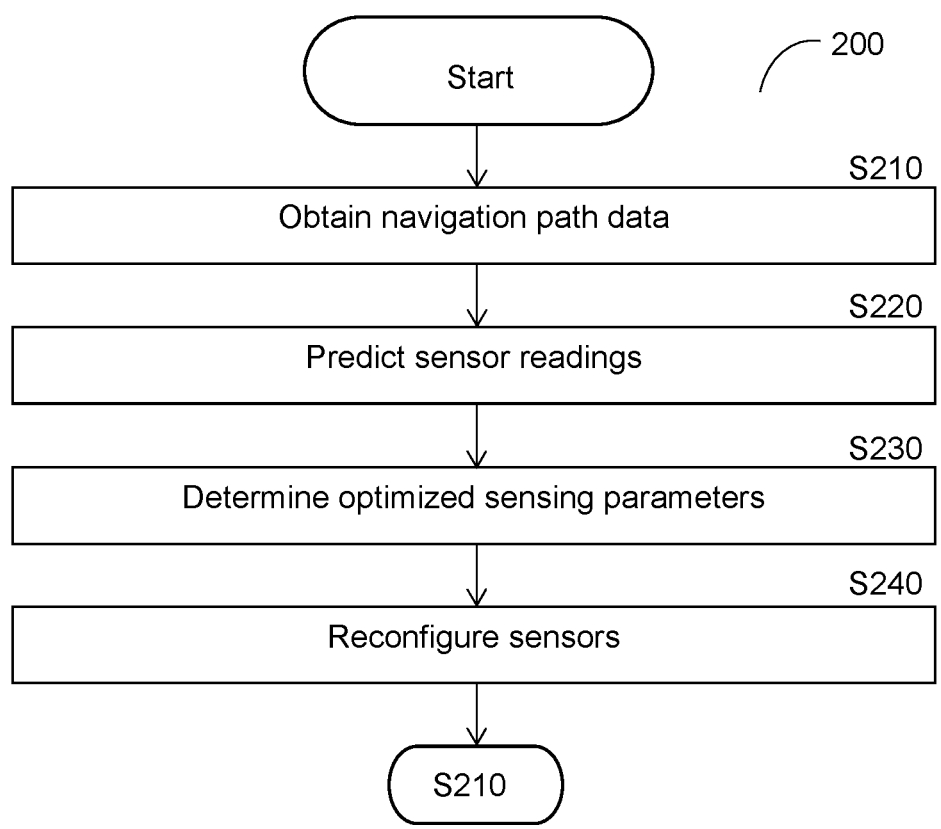
FIG. 2 is a flowchart illustrating a method for optimizing sensor parameters for a moving robotic device according to an embodiment.

FIG. 2 is an example flowchart 200 illustrating a method for optimizing sensory signal capturing by reconfiguring motion control configuration according to an embodiment. In an embodiment, the method is performed by the motion-sensing co-optimizer 130.

At S210, navigation path data is obtained. The navigation path data may be, for example, received from an external system or determined. The navigation path data may indicate a new navigation path or an update to an existing navigation path. The navigation path data may include data collected while moving along a navigation path or generated based on data collected while moving along a navigation path such as, but not limited to, scene geometry, previously collected sensory signals, motion data (e.g., data collected by accelerometers, global positioning systems, gyroscopes, etc.), and the like.

In an embodiment, the navigation path data includes a navigation path. The navigation path at least includes a series of constraints on navigation by a system (e.g., the robotic device 100). The constraints may be, but are not limited to, constraints on at least some of the degrees of freedom of the systems, required positions to be occupied by the system, upper bounds on the uncertainty (covariance) of system state variables (e.g., position), and the like. In a further embodiment, the navigation path may further include a time series indicating a time at which each position of the series of positions should be occupied. To this end, the navigation path may also include kinematics data for moving from each position to the next position in the series. The kinematics data is for moving to the next position such that the system occupies the next position at the corresponding time. The kinematics data may include, but is not limited to, velocity, acceleration, direction, and the like.

In an embodiment, S210 may include determining at least a portion of the navigation path data. The scene geometry may be determined using a simultaneous localization and mapping (SLAM) algorithm or depth camera. A predicted sensor motion may be determined based on the navigation path, i.e., the motion of the sensors may be assumed to be consistent with the motion of the robotic device navigating along the navigation path.

At S220, based on the navigation path data, upcoming sensor readings are predicted. The prediction may be in the form of, for example, expected values of future sensory signals. The predicted sensor readings may include, but are not limited to, image intensity, optical flow, inertial measurement unit (IMU) readings such as angular data and acceleration, wheel encoder readings (e.g., speed or distance), magnetometer readings, barometric pressure readings, GNSS readings, combinations thereof, and the like. The intensity of an image is based on values of image units such as, for example, pixels. The image intensity may be determined based on intensity of previously collected images. The optical flow is a measurement of the motion of image units between images taken at different times.

In an embodiment, the predicted sensor readings are extrapolated from previous sensory signals based on the navigation path data, scene geometry data, motion data, or a combination thereof. The scene geometry data is a three-dimensional structure representing a geometry of the environment in the area surrounding the robotic device. An example method for determining a scene geometry is described further in U.S. patent application Ser. No. 16/750,703, the contents of which are hereby incorporated by reference.

The extrapolation may differ depending on the sensor reading to be predicted. For optical flow, previous optical flow may be extrapolated based on motion data for the robotic device (which may be known for a given path being navigated by the robotic device) and scene geometry. For IMU readings, previous IMU readings may be extrapolated based on navigation path data. For wheel encoder readings, previous wheel encoder readings may be extrapolated based on navigation path data.

The predicted intensity for a future time may be predicted based on predicted sensor motion for the future time, scene geometry determined near the future time (e.g., within a threshold amount of time prior to the future time), and intensity of sensory signals collected near the future time. The optical flow is determined based on the scene geometry and the predicted sensor motion.

In a further embodiment, S220 includes determining a time for one or more sets of predicted sensor readings. The determined time is an expected time of occurrence at which the predicted sensor readings are expected to occur and may be determined, for example, based on the navigation path. The determined time may be further based on motion data. For example, the time may be determined based on a movement speed of the robotic device as it relates to the navigation path such that the time is determined as an expected time of arriving at a point along the motion path based on the speed at which the robotic device approaches that point from a starting time.

At S230, optimized sensor parameters are determined based on the predicted sensor readings in order to improve the quality of resulting sensory signals as compared to sensory signals captured without the optimized sensor parameters. In an embodiment, the optimized sensor parameters are determined based on a predetermined set of optimization criteria for corresponding predicted sensor readings.

In an embodiment, the optimized sensor parameters may include optimal exposure parameters of a sensor (e.g., a camera) such as exposure time, gain, aperture, and the like, as well as illumination power. The optimized exposure parameters and illumination power may be determined based on a predicted image intensity. Alternatively or collectively, the optimized exposure parameters may be determined based on an estimated motion blur. The estimated motion blur may be determined based on an image optical flow. As a non-limiting example, when the estimated motion blur is above a threshold, the camera configuration may be optimized to minimize the motion blur effect by increasing gain and decreasing exposure time.

The optimized sensor parameters may further include capture frequency (e.g., a frame rate for a camera). The optimized capture frequency may be determined, for example, based on optical flow. For example, if optical flow is high (e.g., above a threshold), a camera frame rate may be increased such that images are sampled at a higher rate and, therefore, relative motion between images is smaller. If optical flow is low (e.g., below a threshold), the camera frame rate can be decreased to allow for better exposure conditions (e.g., longer exposure when there is a low amount of environmental light) and to reduce power consumption.

In an example implementation, for optical flow, the sensor parameters are optimized such that motion in the visual multimedia content plane is less than 1 pixel during exposure. In another example implementation, for IMU readings, the sensor parameters are optimized by increasing the gain in order to maximize the sensitivity of readings while maintaining measurements within a relatively small dynamic range of the sensor. To this end, it is noted that, generally, increasing gain reduces the dynamic range. Thus, sensitivity is increased without increasing the number of saturated readings.

At S240, one or more sensors of the robotic device are reconfigured based on the optimized sensor parameters and execution continues with S210 where additional sensor readings are predicted based on newly collected navigation data, updates to the navigation path, or both. In an embodiment, S240 includes reconfiguring the sensor parameters of the sensors to match the optimized sensor parameters at an appropriate time.

The appropriate time is a time prior to the time at which the predicted sensing readings are expected to be collected such that, when the robotic device is reconfigured, the configuration of the robotic device matches an optimal configuration at the expected time of occurrence of the predicted sensor readings. More specifically, the appropriate time may be immediately before or otherwise prior to the time of the predicted sensor readings within a threshold amount of time such that the sensor parameters are optimized only when needed for each set of predicted sensor readings.

Figure 3:
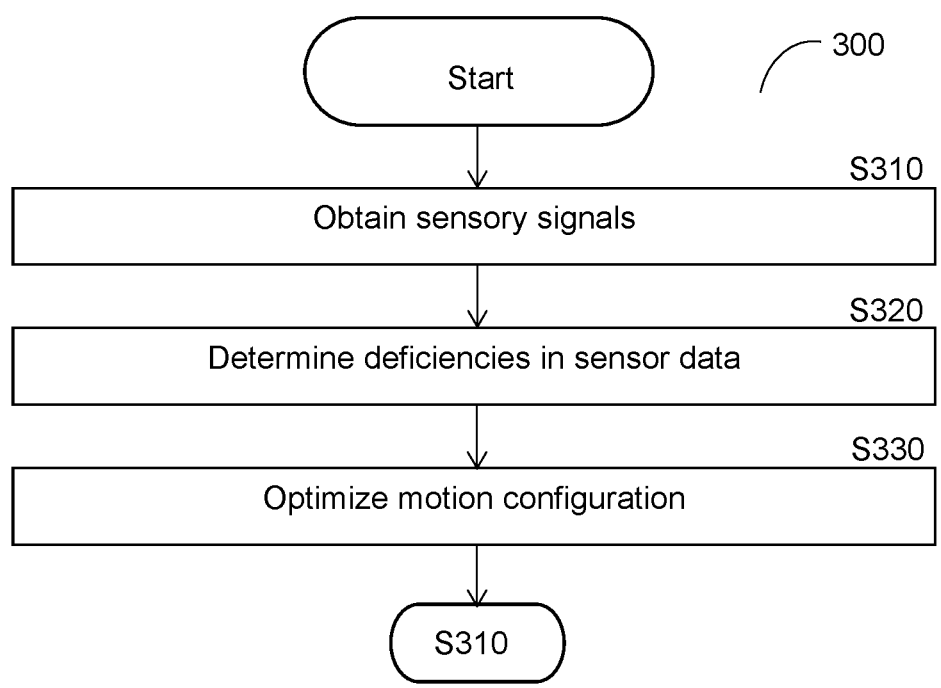
FIG. 3 is a flowchart illustrating a method for controlling motion to optimize visual content capturing by a moving robotic device according to an embodiment.

FIG. 3 is an example flowchart 300 illustrating a method for optimizing sensory signal capturing by reconfiguring motion control configuration according to an embodiment. In an embodiment, the method is performed by the motion-sensing co-optimizer 130.

At S310, sensory signals are obtained. The sensory signals are collected by sensors of a robotic device. The sensory signals may include, but are not limited to, visual multimedia content (e.g., images), inertial sensor readings, motion encoder readings, and the like.

At S320, deficiencies in the sensory signals are determined. In an embodiment, S320 includes one or more of analyzing visual multimedia content to determine exposure, analyzing visual multimedia content to estimate motion blur, applying a SLAM algorithm to determine a number and quality of tracked features, applying a SLAM algorithm to estimate an uncertainty of a position of the robotic device, determining an uncertainty in obstacle detection, determining an uncertainty in gyroscope bias, determining an uncertainty in accelerometer bias, determining an uncertainty in absolute scale, determining an uncertainty in gyroscope gain, determining an uncertainty in magnetic field calibration (e.g., hard iron and soft iron), determining an uncertainty in wheel parameters (e.g., effective wheel diameter), determining an uncertainty of camera-intrinsic calibration properties (e.g., focal length, principle point, distortion coefficients), and estimating slipping of a wheel based on wheel sensor data.

The various uncertainties may be determined using a SLAM algorithm. As a non-limiting example, the uncertainties may be determined directly using an Extended Kalman Filter SLAM which models the above parameters (e.g., gyroscope bias, gyroscope gain, magnetic field calibration, etc.) as part of its state.

At S330, a motion configuration of the robotic device is optimized based on the determined deficiencies and execution continues with S310 for subsequent motion optimization based on newly obtained sensory signals. Specifically, the motion of the robotic device is adjusted to allow for capturing better quality sensory signals.

Various examples for adjusting motion follow. Some of the following examples mention relative descriptors such as significant, high, low, large, and the like. Such relative descriptors may be based on, for example, a threshold. As a non-limiting example, a value may be high if it is above a threshold value and low if it is below a threshold value. Different threshold values may be used for determining whether different relative descriptors are applicable.

Based on an exposure determined for the robotic device, a new navigation path may be generated or motion may be restricted to allow for better exposure. More specifically, when the determined exposure indicates a large overexposed region, a new navigation path may be generated such that glare in subsequently captured visual multimedia content is reduced. When the determined exposure indicates a large underexposed region, a new navigation path may be generated such that light of a scene in subsequently captured multimedia content is increased. When the determined exposure indicates that the image is generally overexposed or underexposed (i.e., the overexposure or underexposure is not localized to a portion of the visual multimedia content), motion may be slowed or halted until better exposure parameters are determined based on subsequently collected sensory signals.

Motion of the robotic device may be restricted, for example, by slowing or stopping motion of the robotic device when it is determined that there is significant (e.g., above a predetermined threshold) blur, when it is determined that the image is low quality, when it is determined that there is a high degree of uncertainty (e.g., uncertainty of position, sensor bias, gain, calibration, etc.), or when there is a large slip in a motor of the robotic device. While the robotic device motion is restricted, the robotic device may perform one or more test actions used to determine bias, gain, calibration, and the like.

Various embodiments for performing test actions and determining bias, gain, calibration, and the like, are described below. In some of these embodiments, it is mentioned that the robotic device performs a maneuver including a 360-degree rotation. In a further embodiment, the 360-degree rotation is a maneuver performed according to the following method. The method allows for making the rotation independent of sensor biases from camera calibration, wheel odometry, gyroscope, and the like. Accordingly, this method for rotation maneuvers allows for increasing accuracy of determinations following the rotation.

In an embodiment, the rotation maneuver includes capturing, by the robotic device, an origin image. The origin image is analyzed to find persistent key points and descriptors (e.g., using a Scale-Invariant Feature Transform, or SIFT algorithm). If additional distance information is available (e.g., distance information determined using the SLAM algorithm), only key points having a distance much larger (e.g., more than 20 times larger) than the translational motion during the maneuver may be utilized. Using such far key points allows for minimizing the parallax during movement such that the rotational motion is predominant, thereby increasing accuracy of determinations related to the rotational motion.

The rotation maneuver is performed by rotating until the orientation of the robotic device is within a first threshold of its original orientation (e.g., within 10 degrees of its original orientation as measured by sensors such as gyros or wheel encoders). Additional images are captured once the robotic device is close to its original orientation (i.e., within the first threshold of the original orientation) until it is determined that the robotic device is within a second threshold of its original orientation (e.g., within 1 degree). An example method for performing a rotation maneuver is described further with respect to FIG. 5.

Figure 5:
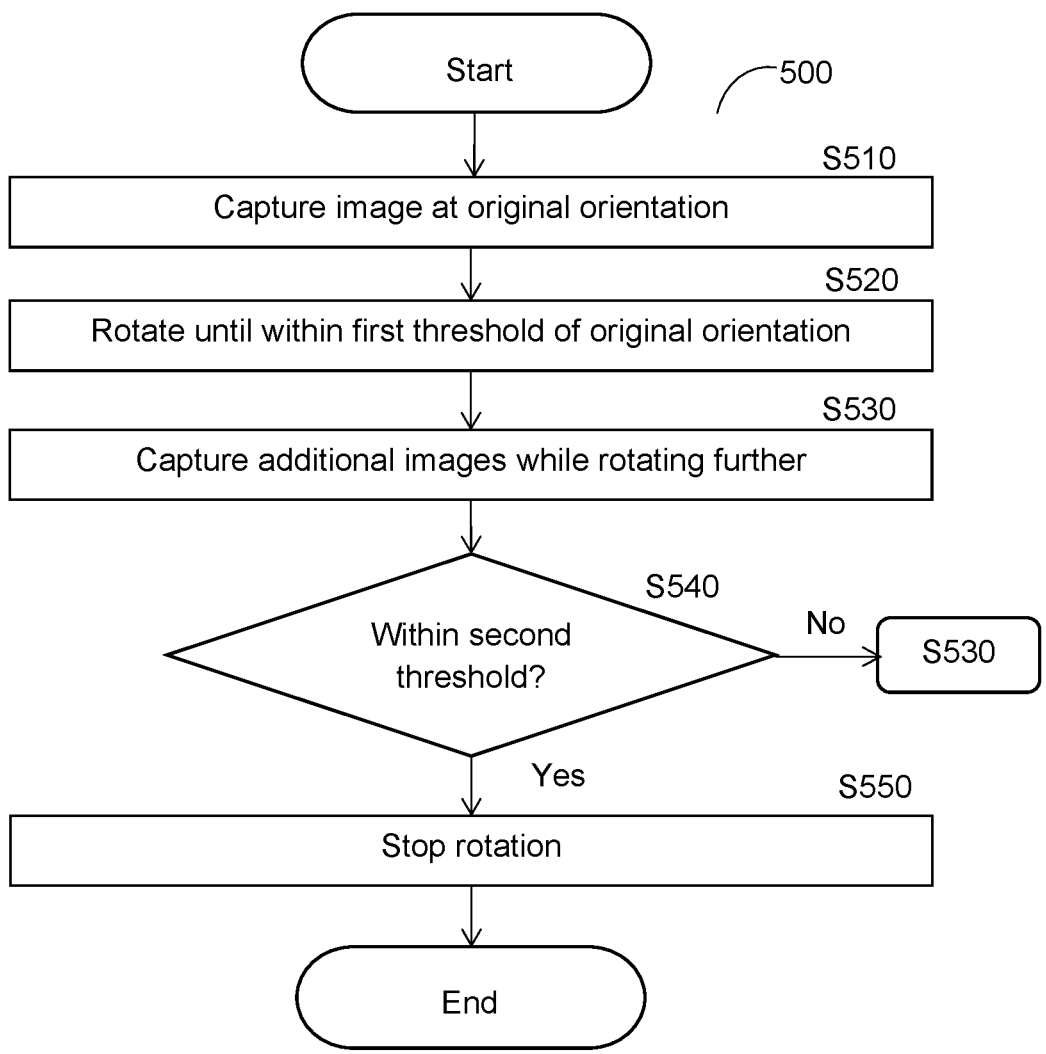
FIG. 5 is a flowchart illustrating a method for performing a rotation maneuver to calibrate sensor readings according to an embodiment.

FIG. 5 shows an example flowchart 500 illustrating a method for performing a rotation maneuver to calibrate sensor readings according to an embodiment. In an embodiment, the method is performed by the robotic device 100, FIG. 1.

At S510, a first image is captured while the robotic device is in an original orientation.

At S520, the robotic device is rotated until within a first threshold of the original orientation. In an example implementation, the first threshold is a first number of degrees from the original orientation. As a non-limiting example, the original orientation may be treated as 0 degrees measured from a point on the robotic device and the robotic device moves around in a nearly full rotation until the point is within 10 degrees of the original orientation (i.e., between −10 degrees and 10 degrees as measured from the point on the robotic device.

At S530, when the robotic device is within the first threshold of the original orientation, the robotic device begins capturing additional second images while continuing to rotate. It should be noted that the continued rotation may be in a different direction than the original rotation, and that the continued rotation may alternate directions, for example when the robotic device rotates until it is outside of the first threshold, it may begin rotating in the other direction.

At S540, based on the additional images captured during the continued rotation, it is determined whether the orientation of the robotic device is within a second threshold of the original orientation and, if so, execution continues with S550; otherwise, execution continues with S530 where the robotic device continues to rotate. In an embodiment, the second threshold is less than the first threshold. As a non-limiting example, when the first threshold is 10 degrees plus or minus the original orientation, the second threshold may be 1 degree plus or minus the original orientation.

Each image captured after rotation begins is analyzed with respect to the origin image to identify matches, for example by matching SIFT descriptors. Based on the matching, a relative rotation between the origin and each subsequently captured image is determined. Such relative rotation may be determined in far perspective by computing the homography transformation. Thus, the images are utilized to identify when the rotation is sufficiently close to 360-degrees. The motion control during the rotation maneuver may be performed in a closed-loop manner such that, once the orientation of the robotic device is within the first threshold of its original rotation, each iteration of the closed loop involves some rotation followed by capture and analysis of another image until the most recent image demonstrates an orientation within the second threshold of the original orientation. Further, the direction of rotation for each subsequent iteration may depend on whether the rotation is larger (e.g., more than 360 degrees plus the threshold) or smaller (e.g., less than 360 degrees minus threshold) than expected. For example, a clockwise rotation may be utilized when the rotation is larger than expected, and a counterclockwise rotation may be utilized when the rotation is smaller than expected or not found.

At S550, when it is determined that the orientation of the robotic device is within the second threshold of the original orientation, the rotation of the robotic device is stop.

As to examples of performing test actions and making determinations based thereon, in an embodiment, when gyroscope bias uncertainty is high (e.g., above a threshold), movement of the robotic device is stopped. While motion of the robotic device is stopped, gyroscope bias is determined using EKF state estimation. Gyroscope bias is repeatedly estimated until the uncertainty is below the threshold, at which point movement of the robotic device resumes. In this regard, it has been identified that a robotic device that is static (i.e., not moving) allows for more easily and accurately calculating gain because the actual velocity and angular velocity are known with very low uncertainty.

In an embodiment, when accelerometer bias uncertainty is high (e.g., above a threshold), the robotic device may perform a maneuver. As a non-limiting example, the robotic device may move forward and backward repeatedly. In a further embodiment, this maneuver may be performed in a closed loop such that the ending position of the robotic device is the same or as close as possible as the starting position prior to the first iteration of the maneuver. Such a maneuver involving moving back and forth from a start to an end position reduces uncertainty regarding the start and end positions. Once the maneuver is complete, accelerometer bias may be estimated by integrating the acceleration twice and computing a value representing the motion of the robotic device. This value is optimized such that the overall motion of the robotic device is zero.

In a further embodiment, the motion of the robotic device is optimized in accordance with the following equations. These equations assume that the start and end points of the maneuver are the same (that is how the maneuver was defined). The overall motion of the robotic device being zero is defined as follows:

$$0 = x_2 - x_1 = \int_{t_1}^{t_2} dt \int_{t_1}^{t} dt \cdot a(t) \qquad \text{Equation 1}$$

Where $x_2$, $x_1$ are the positions at times $t_2$ and $t_1$, respectively (the end and start of the maneuver, respectively) and $a(t)$ is the acceleration of the robotic device at time t.

The accelerometer measures the acceleration with some bias and it also measures the acceleration caused by gravity. To account for bias, the following equation may be used:

$$\vec{a}_{measured} = \vec{a} + \text{bias} + \vec{g} \qquad \text{Equation 2}$$

Further, assuming that the part of acceleration caused by gravity g can be adjusted for, the motions may be represented as follows:

$$\vec{x}_2 - \vec{x}_1 = \int_{t_1}^{t_2} dt \int_{t_1}^{t} dt (\vec{a}_{measured}(t) - \text{bias}) \qquad \text{Equation 3}$$

In the above determination of robotic device motion, it is assumed that the motion of the robotic device is purely linear (i.e., no rotation). The same general equations may be modified to accommodate rotation, which would result in a similar but more complex expression.

Therefore, the motion may be optimized by adjusting the biases in the x axis, y axis, and z axis, such that the expression of Equation 3 becomes equal to 0.

In an embodiment, when absolute motion scale uncertainty is high (e.g., above a threshold), the robotic device may perform a maneuver. As a non-limiting example, the robotic device may move while changing its velocity. The acceleration computed based on visual data (which does not have an absolute scale) is adapted based on the acceleration measured by an accelerometer (which does have an absolute scale). To this end, the absolute scale is estimated, for example using EKF or bundle adjustment.

In an embodiment, when gyroscope gain uncertainty is high (e.g., above a threshold), the robotic device may perform a maneuver. As a non-limiting example, the robotic device may perform a 360-degree rotation. Gyroscope readings captured during the rotation are aggregated in order to compute the total rotation over the 360-degree rotation. Then, the gain is adapted through optimization such that the total rotation is equal to 360 degrees. The result may be used to calibrate one or more angular velocity gains.

In an embodiment, when uncertainty in magnetic field calibration is high (e.g., above a threshold), the robotic device may perform a maneuver. As a non-limiting example, the robotic device may perform a 360-degree rotation. The measured magnetic field ay be fitted to a magnetic model:

$$M_{measured} = R \cdot M_{environment} + M_{robot} \quad \text{Equation 4}$$

In Equation 1, $M_{measured}$ is the magnetic field measured by a sensor mounted on the robotic device, R is the rotation transformation from the reference frame of the environment to the reference frame of the robotic device, $M_{environment}$ is the magnetic field of the environment (e.g., the Earth's known magnetic field at the location of the robotic device), and $M_{robot}$ is the magnetic field of a platform of the robotic device.

In an embodiment, when wheel parameter uncertainty is high (e.g., above a threshold), the robotic device may perform a maneuver. As a non-limiting example, the robotic device may perform a 360-degree rotation clockwise and a 360-degree rotation counterclockwise. The calibration model is as follows.

For the first rotation clockwise when the robotic device includes left and right wheels, the calibration model may be expressed according to the following equation:

$$(D_L \times \omega_{Lcw} - D_R \times \omega_{Rcw}) \times \frac{1}{B} = 2\pi \quad \text{Equation 5}$$

In Equation 2, $D_L$ and $D_R$ are the left and right effective wheel radii, respectively, $\omega_{Lcw}$ and $\omega_{Rcw}$ are the left and right wheel turns (measured by wheel encoders in radians), respectively, and B is the known distance between the wheels.

For the second rotation counterclockwise when the robotic device includes left and right wheels, the calibration model may be expressed according to the following equation:

$$(D_L \times \omega_{Lccw} - D_R \times \omega_{Rccw}) \times \frac{1}{B} = 2\pi \quad \text{Equation 6}$$

In Equation 3, $\omega_{Lccw}$ and $\omega_{Rccw}$ are the left and right counterclockwise wheel turns (measured by wheel encoders in radians), respectively. Since the values of the wheel turns are independent, Equations 2 and 3 can be solved in order to determine the wheel radii $D_L$ and $D_R$.

In an embodiment, when uncertainty of camera-intrinsic calibration properties is high (e.g., above a threshold), the robotic device may perform a maneuver. As a non-limiting example, the robotic device may perform a 360-degree rotation. The camera may be calibrated as follows. First, image correspondence is established between consecutive frames having at least some overlap in their respective fields of view. Establishing image correspondence may include, but is not limited to, computing optical flow. Based on the image correspondence, a relative camera rotation between each set of 2 consecutive images is determined. The relative camera rotations are accumulated. The accumulated rotations are compared to an overall rotation value. In an example implementation, the overall rotation value is $2\pi$. The camera parameters (e.g., the focal length) are adapted such that a rotation using the adapted camera parameters is as close as possible to the overall rotation value.

In an embodiment, when there is a large slip, a motor may be slowed down until slip decreases to below a threshold. The motor slippage may be identified by comparing an expected motion of the robot (e.g., given current configuration and navigation path) as compared to motion measured by, for example, a visual sensor or inertial sensor. The slip may be determined based on the discrepancy, i.e., a discrepancy above a first threshold indicates that there is a slip, and a discrepancy above a second threshold indicates that there is a large slip. Alternatively, the motor slip can be measured using extended Kalman filter (EKF) state estimation in which the motor slippage is determined by comparing a wheel state uncertainty to a threshold.

In another embodiment, if a slip is identified, wheel speed may be decreased. In a further embodiment, if a slip is not identified but a speed of the robotic device is lower than an expected or otherwise requested speed, wheel speed may be increased.

In an embodiment, when light is low (e.g., below a threshold) such that images captured in the environment cannot provide reasonable quality, the robotic device may halt movement and enter a long exposure mode (e.g., a mode having a reduced frame rate) or otherwise accumulate multiple exposure images. Optionally, the robotic device may utilize active light illumination in order to aid visibility. Image accumulation is performed by averaging images captured thus far or by using other temporal filtering. Image signal-to-noise ratio (SNR) is determined based on standard deviation of exposure shown in the accumulated images using a pre-measured image sensor or by online estimation of the temporal noise of the image based on multiple other images. When the SNR is below a threshold, the robotic device moves to a new position and determines SNR again based on a newly captured image and the previously captured images. Moving to new positions and determining SNR may be performed until a SNR above the threshold is determined.

Further, when there is high uncertainty of the current position of the robotic device (i.e., a position that is one of the internal state parameters for a SLAM algorithm), the robotic device may be turned, moved sideways, or otherwise moved to capture more sensory signals of the surrounding area from the same or a similar position. Such turning or sideways movement may be performed, for example, until a known location is recognized based on analysis of sensory signals or to improve geometry estimation by increasing a geometric parallax. Alternatively, the robotic device may be moved to or close to (e.g., within a threshold distance of) a previously occupied position and altitude in order to increase the likelihood of successful re-localization.

In some embodiments, the robotic device may have an absolute positioning sensor (e.g. GPS, Global Navigation Satellite System, etc.). In such embodiments, the robotic device may be configured to create a map of the positioning uncertainty of the absolute positioning sensor (e.g., as reported by the sensor). When a motion is planned, the robotic device is configured to plan a route including a path through an area with high accuracy of the absolute positioning sensor such that the positioning accuracy will be maintained while navigating through the route.

It has been identified that many sensors are sensitive to temperature (i.e., changes in temperature may cause errors in the readings of the sensor). This is particularly noticeable in gyroscopes, accelerometers, and magnetometers. To this end, in an embodiment, the robotic device may be configured to perform an appropriate calibration maneuver (suitable to the specific sensor) whenever the temperature (e.g., as indicated by internal sensor temperature measurements) has changed above a threshold (e.g., 3 degrees Celsius greater or less) since the last calibration of the sensor.

Figure 4:
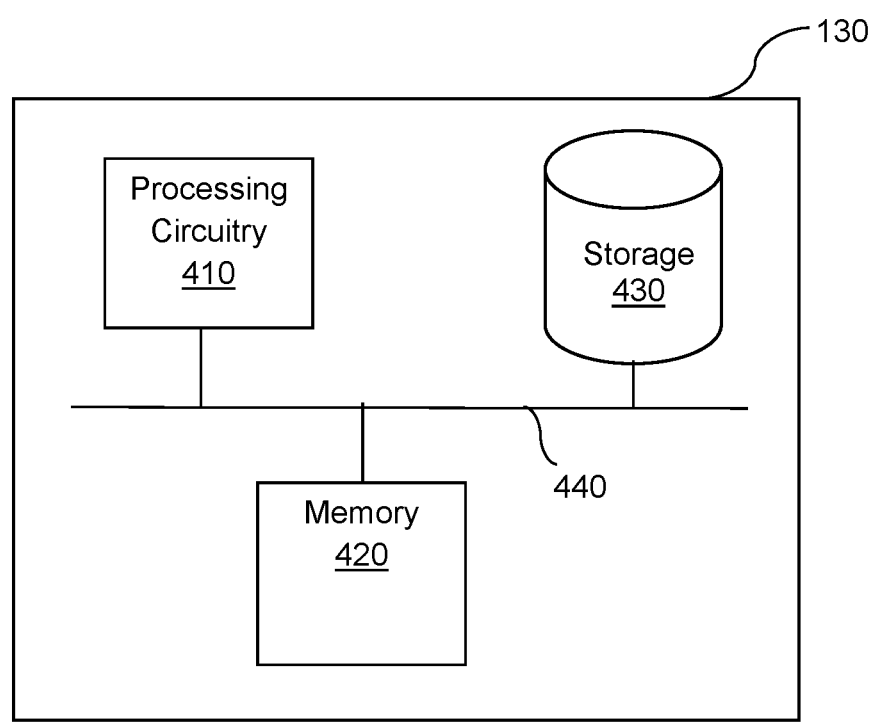
FIG. 4 is a block diagram of a motion-sensing co-optimizer according to an embodiment.

FIG. 4 is an example block diagram of a motion-sensing co-optimizer 130 according to an embodiment. The motion-sensing co-optimizer 130 includes a processing circuitry 410 coupled to a memory 420, and a storage 430, In an embodiment, the components of the motion-sensing co-optimizer 130 may be communicatively connected via a bus 440. In some implementations, the motion-sensing co-optimizer 130 may further include a network interface (not shown).

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for optimizing capture of sensory signals, comprising:
   determining at least one predicted future sensor reading for a robotic device based on navigation path data of the robotic device, wherein the robotic device is deployed with at least one sensor, wherein each predicted future sensor reading is an expected value of a future sensory signal;
   determining an optimized sensor configuration based on the at least one predicted future sensor reading, wherein the optimized sensor configuration optimizes capturing of sensor signals by the at least one sensor; and
   reconfiguring the at least one sensor based on the optimized sensor configuration, wherein reconfiguring the at least one sensor further comprises modifying at least one sensor parameter of the at least one sensor based on the optimized sensor configuration.

2. The method of claim 1, further comprising:
   determining an expected time of occurrence for the at least one predicted future sensor reading, wherein the robotic device is reconfigured such that the at least one sensor parameter of the robotic device matches the optimized sensor configuration at the expected time of occurrence.

3. The method of claim 2, wherein the navigation path data includes a series of positions and a time series, wherein the series of positions indicates a plurality of positions which the robotic device will occupy in the future, wherein the time series indicates a corresponding time at which the robotic device will occupy each of the plurality of positions, wherein the expected time for the at least one predicted future sensor reading is determined based further on the series of positions and the time series.

4. The method of claim 1, further comprising:
determining a predicted future sensor motion based on the navigation path data, wherein the at least one predicted future sensor reading is determined based further on the predicted future sensor motion.

5. The method of claim 1, wherein the at least one predicted future sensor reading is extrapolated based on at least one previous sensor reading, wherein the at least one predicted future sensor reading is extrapolated based further on the navigation path data and scene geometry data of an environment in which the robotic device is deployed.

6. The method of claim 1, wherein the optimized sensor configuration includes an optimal exposure parameter for the at least one sensor, wherein the at least one predicted future sensor reading includes at least one of image intensity and motion blur.

7. The method of claim 1, wherein the optimized sensor configuration includes an optimal capture frequency for the at least one sensor.

8. The method of claim 1, wherein the at least one sensor includes an inertial measurement unit, wherein the at least one sensor parameter includes a gain, wherein modifying the at least one sensor parameter includes increasing the gain while maintaining measurements of the inertial measurement unit within a dynamic range.

9. The method of claim 1, wherein the robotic device is any of: a lawn mowing robot, a floor cleaning robot, and a warehouse logistics robot.

10. A non-transitory computer readable medium having stored thereon instructions for causing a processing circuitry to execute a process, the process comprising:
determining at least one predicted future sensor reading for a robotic device based on navigation path data of the robotic device, wherein the robotic device is deployed with at least one sensor, wherein each predicted future sensor reading is an expected value of a future sensory signal;
determining an optimized sensor configuration based on the at least one predicted future sensor reading, wherein the optimized sensor configuration optimizes capturing of sensor signals by the at least one sensor; and
reconfiguring the at least one sensor based on the optimized sensor configuration, wherein reconfiguring the at least one sensor further comprises modifying at least one sensor parameter of the at least one sensor based on the optimized sensor configuration.

11. A system for optimizing capture of sensory signals, comprising:
a processing circuitry; and
a memory, the memory containing instructions that, when executed by the processing circuitry, configure the system to:
determine at least one predicted future sensor reading for a robotic device based on navigation path data of the robotic device, wherein the robotic device is deployed with at least one sensor, wherein each predicted future sensor reading is an expected value of a future sensory signal;
determine an optimized sensor configuration based on the at least one predicted future sensor reading, wherein the optimized sensor configuration optimizes capturing of sensor signals by the at least one sensor; and
reconfigure the at least one sensor based on the optimized sensor configuration, wherein reconfiguring the at least one sensor further comprises modifying at least one sensor parameter of the at least one sensor based on the optimized sensor configuration.

12. The system of claim 11, wherein the system is further configured to:
determine an expected time of occurrence for the at least one predicted future sensor reading, wherein the robotic device is reconfigured such that the at least one sensor parameter of the robotic device matches the optimized sensor configuration at the expected time of occurrence.

13. The system of claim 12, wherein the navigation path data includes a series of positions and a time series, wherein the series of positions indicates a plurality of positions which the robotic device will occupy in the future, wherein the time series indicates a corresponding time at which the robotic device will occupy each of the plurality of positions, wherein the expected time for the at least one predicted future sensor reading is determined based further on the series of positions and the time series.

14. The system of claim 11, wherein the system is further configured to:
determine a predicted future sensor motion based on the navigation path data, wherein the at least one predicted future sensor reading is determined based further on the predicted future sensor motion.

15. The system of claim 11, wherein the at least one predicted future sensor reading is extrapolated based on at least one previous sensor reading, wherein the at least one predicted future sensor reading is extrapolated based further on the navigation path data and scene geometry data of an environment in which the robotic device is deployed.

16. The system of claim 11, wherein the optimized sensor configuration includes an optimal exposure parameter for the at least one sensor, wherein the at least one predicted future sensor reading includes at least one of image intensity and motion blur.

17. The system of claim 11, wherein the optimized sensor configuration includes an optimal capture frequency for the at least one sensor.

18. The system of claim 11, wherein the at least one sensor includes an inertial measurement unit, wherein the at least one sensor parameter includes a gain, wherein modifying the at least one sensor parameter includes increasing the gain while maintaining measurements of the inertial measurement unit within a dynamic range.

19. The system of claim 11, wherein the robotic device is any of: a lawn mowing robot, a floor cleaning robot, and a warehouse logistics robot.

* * * * *